United States Patent [19]

Cole, Jr.

[11] 4,104,132

[45] Aug. 1, 1978

[54] METHOD FOR ELIMINATING SOLUTION-LEVEL ATTACK ON CATHODES DURING ELECTROLYSIS

[75] Inventor: Ernest R. Cole, Jr., Newburg, Mo.

[73] Assignee: The United States of America as represented by the Secretary of the Interior, Washington, D.C.

[21] Appl. No.: 818,183

[22] Filed: Jul. 22, 1977

[51] Int. Cl.² .......................... C25C 1/16; C25C 7/00
[52] U.S. Cl. ....................................... 204/12; 204/119
[58] Field of Search ................ 204/12, 281, 119, 282, 204/DIG. 7, DIG. 1

[56] References Cited

U.S. PATENT DOCUMENTS

| 1,700,178 | 1/1929 | Porzel | 204/282 |
|---|---|---|---|
| 1,925,339 | 9/1933 | Ralston et al. | 204/55 R |
| 2,058,259 | 10/1936 | Ralston et al. | 204/12 |
| 3,948,747 | 4/1976 | Cordiano et al. | 204/DIG. 1 |
| 3,981,784 | 9/1976 | Pace et al. | 204/105 R |

*Primary Examiner*—T. M. Tufariello
*Attorney, Agent, or Firm*—William S. Brown; Donald A. Gardiner

[57] ABSTRACT

A method for electrolytic deposition of metals, particularly zinc, in which the tendency for the cathode to be attacked in the immediate vicinity of the solution level is eliminated or greatly reduced by positioning a barrier structure in the cell assembly in a manner such that it extends from slightly above to slightly below the level of the solution in the cell. The barrier, which may be of any material resistant to attack by the electrolytic solution, prevents the migration of the oxygen at the solution level and thus protects the cathode from solution level attack.

6 Claims, No Drawings

METHOD FOR ELIMINATING SOLUTION-LEVEL ATTACK ON CATHODES DURING ELECTROLYSIS

BACKGROUND OF THE INVENTION

This invention relates to an improvement in the cell assembly used in the electrolytic deposition of metals such as zinc. In a conventional zinc recovery process, roasted zinc ore is leached with a sulfuric acid solution to dissolve the zinc and form a solution of zinc sulfate. The pure zinc is then recovered from the zinc sulfate solution by electrolysis, the zinc being deposited on the cathode plates which form part of a series circuit through the electrolyte to the anode plates. When the electrolysis is complete, the zinc is stripped from the plates and processed to prepare the bulk metal.

Since the beginning of the commercial use of electrolysis to recover zinc from zinc sulfate solutions aluminum cathodes have been used. The zinc is deposited on the aluminum cathode from the zinc sulfate solution and stripped off periodically for melting.

The use of aluminum cathodes poses several problems. Aluminum cathodes have a high initial cost due to the fact that a specially refined metal must be employed in their manufacture. Ordinary commercial aluminum is not satisfactory for cathode use due to its high tendency to corrode in the presence of an electrolyte. High-grade aluminum is also corroded by electrolytes commonly employed, especially above the solution line. In addition, the deposited zinc has a tendency to stick to the aluminum cathode due to the presence of fluoride ion in the electrolyte which etches the aluminum cathode. Furthermore, it is generally necessary to apply edge strips to facilitate stripping of the zinc deposits from the aluminum.

U.S. Pat. No. 2,058,259 discloses the substitution of zinc cathodes for the aluminum cathodes and suggests that the problems of solution line corrosion can be solved by attaching a film or coating of a protective material to the starting sheet prior to commencement of the electrolytic operation to effectively inhibit corrosion of the cathode at the solution line.

U.S. Pat. No. 3,579,431 relates to a specific cell design for the deposition of metal and incidentally discloses the application of a coating of material, preferably polyvinyl chloride resin approximately four inches wide, to the aluminum cathodes to provide a coating about two inches above and two inches below the solution line.

BRIEF DESCRIPTION OF THE INVENTION

The present invention is directed to a method for eliminating attack on the cathode of a cell used for electrolytically depositing metals from an electrolyte in which a barrier structure that is not attacked by the electrolyte solution is positioned between the anode and the cathode. The barrier extends a distance of about 1 to 10 centimeters below and 1 to 10 centimeters above the solution line depending on the size of the cell being used in the process.

DETAILED DESCRIPTION OF THE INVENTION

The instant invention relates to a method of improving the process of recovering zinc metal from zinc ore. Broadly, prior art processes consist of roasting sulfide-type ores to prepare a zinc calcine that contains 50 to 65 percent zinc. More than 90 percent of the zinc is present as the oxide, with up to 4 percent present as a sulfate and a few percent present as zinc ferrite.

The calcine is leached with dilute sulfuric acid obtained from electrolytic cells. The zinc sulfate is then purified to remove other elements such as arsenic, antimony, copper, cadmium, iron, nickel, tin, germanium, selenium, tellurium, silicon, and aluminum. The purified zinc sulfate solution is then electrolyzed, the electrolysis being represented by the reaction:

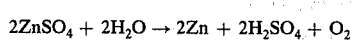

$$2ZnSO_4 + 2H_2O \rightarrow 2Zn + 2H_2SO_4 + O_2$$

The zinc is liberated at the cathode and the oxygen is liberated at the anode. The sulfuric acid generated in the cell is recirculated to the leaching operation; additional sulfuric acid is added as needed to replace process losses.

The problems inherent in the use of aluminum cathodes can be solved by the use of zinc cathodes. The use of zinc cathodes not only eliminates the sticking, but also enables processing of zinc concentrates containing fluorides and eliminates the necessity for the edge strips conventionally used to facilitate the stripping of the zinc deposits from the aluminum.

The previous attempts to substitute zinc cathodes for aluminum cathodes have failed due to solution level corrosion of the zinc cathode, which may actually allow it to drop off into the cell. Attempts to deal with the problem heretofore have been hindered by lack of knowledge as to what causes solution level attack. After careful observation of the cell, it was concluded that oxygen from the anode passes across the solution at the surface during electrolysis and oxidizes the zinc cathode at the solution line. The zinc oxide is subsequently dissolved by the electrolyte causing severe damage and even loss of the cathode into the cell. It has been found, according to the present invention, that the problem of solution level attack can be solved by positioning a physical barrier between the cathode and the anode to prevent transport of the oxygen from the anode and thus prevent oxidation and subsequent dissolution of the zinc cathode.

U.S. Pat. No. 2,058,259 to Ralston et al., mentioned above, suggests the substitution of zinc cathodes for aluminum cathodes, and the problem of corrosion of the cathode at the solution line is stated to be solved by providing the zinc cathodes with a protective coating of a plastic material such as rubber at or adjacent to the initial solution line. The coating extends a short distance above and a short distance below the solution line. This method is time consuming, expensive, and the coating causes problems during melting of the zinc in the melting furnace.

Another method suggested is to submerge the entire cathode below the solution level with the cathode connected to the power supply by a large shank. This solution is costly and impractical.

The present invention is an improvement over the processes of the prior art in that it solves the problems inherent in the use of aluminum cathodes by substitution of zinc cathodes without encountering the problems that are caused by the application of paint or other coatings to the zinc cathodes. The barrier structure of this invention can be fabricated from any substance that is not attacked by the electrolyte.

In the preferred method of operation, a sheet of plastic material, such as the material currently available under the trade name "Plexiglass" (poly-methyl methacrylate), is suspended from the structure that holds the electrodes and extends into the solution of the electrolyte between cathode and anode. The barrier structure preferably extends across the width of the electrolytic cell and extends into the electrolyte solution a distance of about 1 to 10 centimeters and above the electrolyte solution a distance of about 1 to 10 centimeters depending on the size of the cell. These barriers must be of sufficient vertical height to cover variations in the height of solution in the cell. A barrier having a vertical height of 20 centimeters is generally adequate. The barrier can be of any thickness that can be handled conveniently, a thickness of about 2 centimeters normally being adequate.

Although the invention is described as an electrolytic system that is designed for the electrowinning of zinc, it can obviously be used for other electrolysis systems where the cathode is attacked at the solution level.

The present invention is illustrated by the following specific non-limiting examples.

EXAMPLE I

This example illustrates the problem normally encountered when zinc is deposited on a zinc cathode from a zinc sulfate solution.

A solution of zinc sulfate was prepared by dissolving zinc oxide in sulfuric acid to prepare a solution having a $Zn++$ concentration of 65 grams per liter and a sulfuric acid concentration of 200 grams per liter. The solution was transferred to a cell having a capacity of 4 liters and a lead oxide-coated titanium anode having a dimension of 3 × 9 inches and a rolled zinc cathode 3 × 9 Inches × 0.032 inch thick. The electrodes were spaced 1.5 inches apart. The solution was electrolyzed using a current density of 50 amps per square foot which was supplied by 40 amp, 50 volt power supply as a constant source of direct current. The cell temperature was maintained at 35°–45° C., and the electrolysis was carried out for a period of 24 hours. At the end of this time the zinc electrode was examined and found to be almost completely dissolved at the solution line.

EXAMPLE II

This example illustrates the improvement when the cell is operated with a barrier positioned between the anode and the cathode.

A zinc sulfate solution was made up to have the same concentration as in Example I. The cell was operated under exactly the same conditions with the exception that "Plexiglass" strips were placed between the anode and the cathode. These strips extended across the width of the cell and were attached to a bar supporting the electrodes. The "Plexiglass" strips extended about 1 centimeter below and above the level of the solution. After 24 hours of operation, the cathode was examined. There was no detectable indication of solution level attack on the zinc cathode.

Although the examples illustrate the preferred embodiment of the disclosed invention, other materials which have sufficient rigidity to be handled conveniently and are not attacked by the electrolyte can be substituted for "Plexiglass" in fabricating the barrier. Other suitable materials include "Teflon" (polytetrafluoroethylene), rubber, wood, and plastic materials such as polyvinyl chloride. The barrier can be attached to the sides of the cell or can be attached to the structure supporting the electrodes or suspended therefrom. The only requirement as to the dimensions of the barrier is that it extend beyond the width of the electrodes a sufficient distance to prevent oxygen transport from the anode to the cathode and that it extend above and below the solution a sufficient distance to compensate for variations in the solution level in the cell. Modifications and variations can be made without departing from the inventive concept.

What is claimed is:

1. In a process for electrolytically depositing zinc from a solution of an electrolyte in a cell by passing a current from the anode to the cathode and depositing the zinc on the cathode, the improvement consisting of positioning a barrier structure between, but not in contact with, said anode and said cathode and extending above and below the solution level to eliminate oxygen attack on said cathode at solution level during operation of said cell.

2. The process according to claim 1 wherein the electrolyte is a zinc sulfate solution.

3. The process according to claim 2 wherein said cathode is zinc metal.

4. The process according to claim 1 wherein said barrier structure is a strip of a plastic material.

5. The process according to claim 4 wherein said barrier extends from the top of the cell into the electrolyte a distance about 1 to 10 centimeters.

6. The process according to claim 1 wherein said barrier extends substantially across the width of the cell.

* * * * *